United States Patent
Patil et al.

(10) Patent No.: US 11,316,871 B2
(45) Date of Patent: Apr. 26, 2022

(54) ENCRYPTED TRAFFIC ANALYTICS OVER A MULTI-PATH TCP CONNECTION

(71) Applicant: Cisco Technology, Inc., San Jose, CA (US)

(72) Inventors: Santosh Ramrao Patil, Santa Clara, CA (US); Gangadharan Byju Pularikkal, San Jose, CA (US); David McGrew, Poolesville, MD (US); Blake Harrell Anderson, Chapel Hill, NC (US); Madhusudan Nanjanagud, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 580 days.

(21) Appl. No.: 15/891,708

(22) Filed: Feb. 8, 2018

(65) Prior Publication Data
US 2019/0245868 A1 Aug. 8, 2019

(51) Int. Cl.
*H04W 28/00* (2009.01)
*H04L 29/06* (2006.01)
(Continued)

(52) U.S. Cl.
CPC ......... *H04L 63/1408* (2013.01); *H04W 28/00* (2013.01); *H04L 43/04* (2013.01);
(Continued)

(58) Field of Classification Search
CPC ......... H04L 69/14; H04L 69/22; H04L 45/24; H04L 45/245; H04L 69/16; H04L 47/193; H04L 47/822; H04W 76/15; H04W 80/06
See application file for complete search history.

(56) References Cited

U.S. PATENT DOCUMENTS

| 9,455,897 | B2 | 9/2016 | Krishnaswamy et al. |
| 2014/0269269 | A1* | 9/2014 | Kovvali ............... H04W 24/04 370/229 |

(Continued)

OTHER PUBLICATIONS

M. Boucadair, et al., "DHCP Options for Network-Assisted Multipath PCT (MPTCP)", draft-boucadair-mptcp-dhc-04, Network Working Group, Internet-Draft, https://trac.tools.ietf.org/id/draft-boucadair-mptcp-dhc-04.html, Nov. 17, 2015, 8 pages.

(Continued)

*Primary Examiner* — Tom Y Chang
(74) *Attorney, Agent, or Firm* — Edell, Shapiro & Finnan, LLC

(57) ABSTRACT

Methods and systems to estimate encrypted multi-path TCP (MPTCP) network traffic include restricting traffic in a first direction (e.g., uplink) to a single path, and estimating traffic of multiple subflows of a second direction (e.g., downlink) based on traffic over the single path of the first direction. The estimating may be based on, without limitation, acknowledgment information of the single path, a sequence of acknowledgment numbers of the single path, an unencrypted initial packet sent over the single path as part of a secure tunnel setup procedure, TCP header information of the unencrypted initial packet (e.g., sequence number, acknowledgment packet, and/or acknowledgment packet length), and/or metadata of packets of the single path (e.g., regarding cryptographic algorithms, Diffie-Helman groups, and/or certificate related data).

20 Claims, 5 Drawing Sheets

(51) Int. Cl.
    H04L 43/04       (2022.01)
    H04L 69/16       (2022.01)
    H04W 24/00       (2009.01)
    H04W 24/08       (2009.01)
(52) U.S. Cl.
    CPC .............. *H04L 63/14* (2013.01); *H04L 69/16* (2013.01); *H04W 24/00* (2013.01); *H04W 24/08* (2013.01)

(56) References Cited

U.S. PATENT DOCUMENTS

| | | |
|---|---|---|
| 2015/0312383 A1 | 10/2015 | Roeland et al. |
| 2017/0104717 A1* | 4/2017 | Vesterinen ............ H04L 5/0098 |
| 2017/0104774 A1* | 4/2017 | Vasseur .................. G06N 20/00 |
| 2017/0231018 A1* | 8/2017 | Hahn .................... H04W 76/10 |
| 2017/0244639 A1* | 8/2017 | Szilagyi ................. H04L 47/12 |
| 2017/0373950 A1* | 12/2017 | Szilagyi ................. H04L 43/00 |
| 2018/0139511 A1* | 5/2018 | Brockmann ......... H04N 21/233 |
| 2018/0309664 A1* | 10/2018 | Balasubramanian ... H04L 45/22 |
| 2019/0140966 A1* | 5/2019 | Geffen .................... H04L 47/34 |
| 2019/0150011 A1* | 5/2019 | Shoji .................... H04B 7/0626 |
| | | 370/329 |
| 2019/0334672 A1* | 10/2019 | Byun .................... H04L 5/0094 |
| 2020/0229253 A1* | 7/2020 | Kucera .................. H04L 45/24 |

OTHER PUBLICATIONS

J. Manzoor, et al., "Measurement and Analysis of Modern Web Traffic and Network Protocols", May 2017, 1 page.
Tessares, "Apple opens Multipath TCP in iOS11", Jun. 9, 2017, 6 pages.
MPTCP, "Commercial usage of Multipath TCP", Dec. 25, 2015, 7 pages.
A. Ford et al., "TCP Extensions for Multipath Operation with Multiple Addresses", Internet Engineering Task Force (IETF), Jan. 2013, 64 pages.

* cited by examiner

ENCRYPTED TRAFFIC ANALYTICS OVER A MULTI-PATH TCP CONNECTION

TECHNICAL FIELD

This disclosure relates to techniques for multi-path networking.

BACKGROUND

Network traffic analysis is a process of analyzing network traffic for performance, security, and/or general network operations and management. Network traffic analysis is challenging when network traffic is encrypted. Encrypted network traffic analysis is even more challenging in a multi-path Transmission Control Protocol (TCP) scenario. As a result, an enterprise may choose to disable multi-path TCP capabilities to avoid the risk of malware hidden within encrypted communications.

DESCRIPTION OF EXAMPLE EMBODIMENTS

Overview

Figure 1:
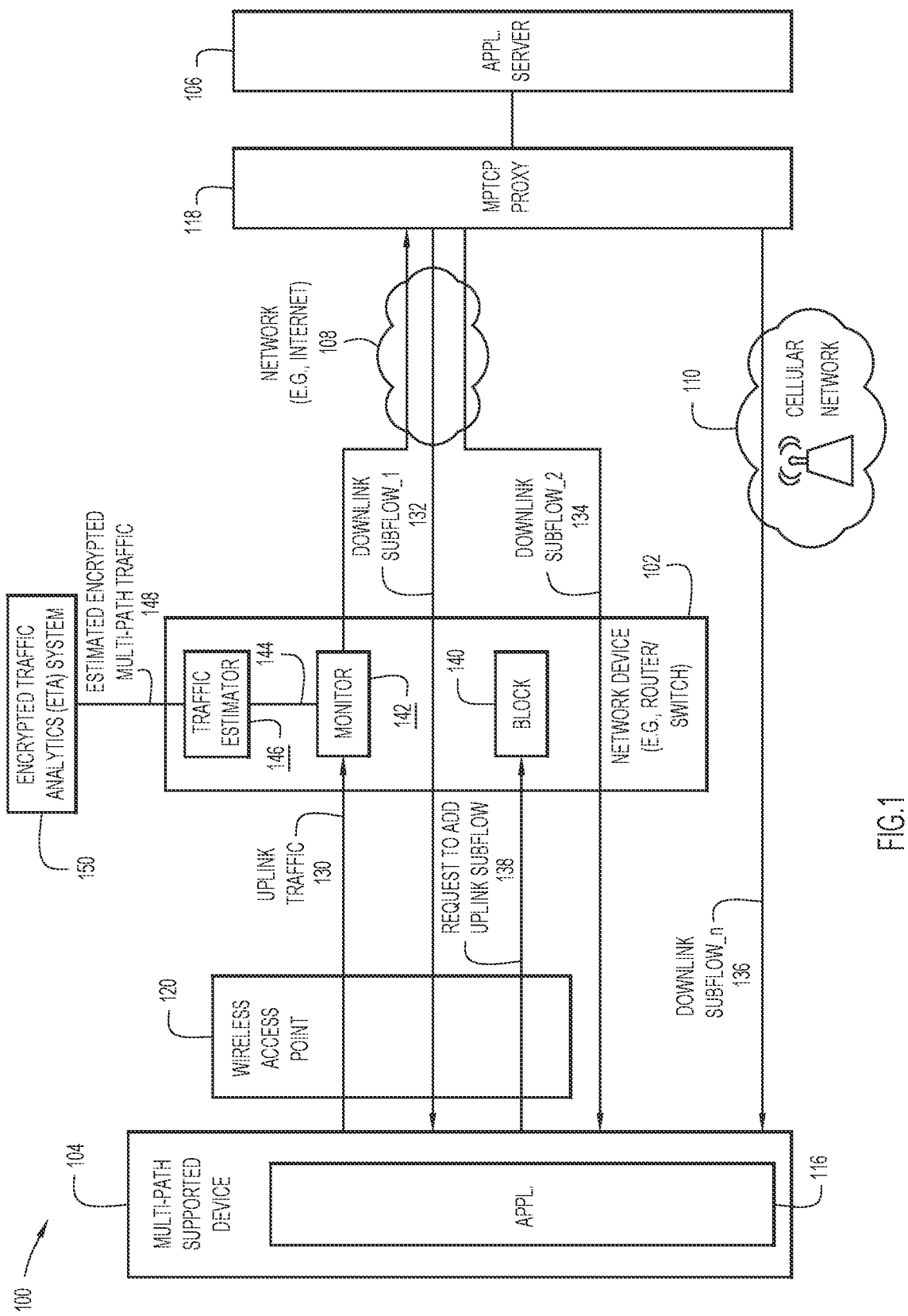
FIG. 1 is a block diagram of a multi-path Transmission Control Protocol (MPTCP) networking environment in which techniques for estimating encrypted multi-path network traffic may be employed, according to an example embodiment.

In one embodiment, a method is provided for estimating encrypted multi-path traffic at a network device in a network. The method includes receiving traffic of a multi-path transmission control protocol (MPTCP) communication session, restricting the MPTCP communication session to a single path in a first direction, monitoring traffic of the single path during the MPTCP communication session, and estimating multi-path traffic of a second direction of the MPTCP communication session from the traffic of the single path.

EXAMPLE EMBODIMENTS

Network traffic analytics seek to determine how a network is being accessed, what applications are being used, when they are used, and whether the applications are safe and compliant with policies of an enterprise.

Network traffic is increasingly being encrypted. While encryption has numerous benefits, attackers may inject malware, bots, and/or ransomware inside encrypted traffic. Technical issues and privacy concerns make it difficult to analyze encrypted network traffic.

Encrypted Traffic Analytics (ETA) technology has been developed to classify and mitigate threats within encrypted traffic, without decrypting the packets. ETA technology may work in conjunction with other analytics and monitoring technologies that may use multi-layer machine learning to detect threats in encrypted traffic without decrypting the traffic.

Such analytics and monitoring technologies allow an enterprise to see the number of malicious applications and activities on a network, and provide a mechanism to quarantine such users from the network. ETA technology leverages innovative techniques such as sequence of packet length, timing, and initial data packets to detect malicious traffic using a cloud-based threat signature repository in order to keep up-to-date with the latest threats in the world.

A Transmission Control Protocol (TCP) connection or session is established between two Internet Protocol (IP) addresses. Each TCP connection is identified by a four-tuple (source and destination addresses and ports). Given this restriction, an application can only create one TCP connection through a single link. Multi-path TCP allows the connection to use several paths simultaneously. For this, multi-path TCP creates one TCP connection, called a subflow, for each path.

Multi-path TCP allows a TCP connection to use multiple paths, which may be useful to maximize resource usage and/or to increase redundancy. Multi-Path TCP is a way to establish a connection between hosts rather than between interfaces (as with conventional TCP). For mobile (cellular) devices, Multi-Path TCP can be configured to utilize a combination of Wi-Fi Cellular (e.g., 4G/5G), paths for an application.

Multi-path TCP is useful in the context of wireless networks. A Wi-Fi® wireless local area network and a mobile network are typical use cases. In addition to gains in throughput from inverse multiplexing, links may be added or dropped as the mobile user moves in or out of coverage without disrupting the end-to-end TCP connection. The problem of link handover is thus mooted by abstraction in the transport layer, without any special mechanisms at the network or link level. Handover functionality may thus be implemented at the endpoints without requiring special functionality in the subnetworks, in keeping with the end-to-end principle of the Internet.

In order to facilitate deployment, multi-path TCP presents the same socket interface as TCP. This implies that any standard TCP application may be used above multi-path TCP while in fact spreading data across several subflows.

Multi-path TCP is backwards compatible with single path TCP.

Multi-path TCP (MPTCP) standards are governed by the Multi-path TCP working group of the Internet Engineering Task Force (IETF). In January, 2013, the IETF published a multi-path specification as an Experimental standard in RFC 6824. Multi-path TCP options are described in RFC 6824. Multi-path TCP options are encoded as TCP options with Option Kind is 30, as reserved by IANA.

The Multi-path TCP option has the Kind (30), length (variable), and the remainder of the content begins with a 4-bit subtype field, for which IANA has created and will maintain a sub-registry entitled "MPTCP Option Subtypes" under the "Transmission Control Protocol (TCP) Parameters" registry. Those subtype fields are listed in Table 1 below.

TABLE 1

| Value | Symbol | Name |
| --- | --- | --- |
| 0 × 0 | MP_CAPABLE | Multi-path Capable |
| 0 × 1 | MP_JOIN | Join Connection |
| 0 × 2 | DSS | Data Sequence Signal (Data ACK and data sequence mapping) |
| 0 × 3 | ADD_ADDR | Add Address |
| 0 × 4 | REMOVE_ADDR | Remove Address |
| 0 × 5 | MP_PRIO | Change Subflow Priority |
| 0 × 6 | MP_FAIL | Fallback |
| 0 × 7 | MP_FASTCLOSE | Fast Close |
| 0 × 8 through 0 × e | | Unassigned |
| 0 × f | (PRIVATE) | Private Use within Controlled Test Beds |

Encrypted traffic over multi-path TCP raises additional challenges for network traffic security monitoring/analysis. Specifically, it may be relatively challenging to obtain an aggregate view of traffic/patterns across multiple uplink paths and multiple downlink paths of an application. It may be even more challenging when a heterogeneous network has been used by a device, such as mobile wireless device that has some downlink subflows on a cellular network (e.g., a 4G/5G network) and some of the subflows in Wi-Fi® wireless local area network.

Accordingly, embodiments are presented herein to estimate encrypted multi-path network traffic, which may be useful in encrypted traffic analytics.

Reference is now made to FIG. 1. FIG. 1 is a block diagram of a multi-path networking environment 100 in which techniques for estimating encrypted multi-path network traffic may be employed, according to an example embodiment. In one embodiment, the multi-path networking environment may employ MPTCP techniques.

Multi-path networking environment 100 includes a network device 102 (e.g., a router and/or switch), to receive traffic of a multi-path communication session or connection.

Multi-path networking environment 100 further includes a MPTCP supported device 104 (e.g., a user device), and an application server 106. Device 104 and application server 106 are configured to communicate with one another over one or more communication networks, illustrated as a network 108 (e.g., the Internet), and a cellular network 110. The device 104 may execute an application 116 that consumes and sources network traffic.

Multi-path networking environment 100 further includes a MPTCP proxy 118 to provide MPTCP networking services on behalf of application server 106 (i.e., to permit device 104 and application server 106 to communicate with one another over a MPTCP connection). This may be useful for a legacy application server that lacks support for MPTCP. Alternatively, if application server 106 is configured to provide MPTCP networking services, MPTCP proxy 118 may not be necessary.

Device 104 and MPTCP proxy 118 (or application server 106), may be configured to communicate with one another over a MPTCP connection or session, and may be configured in accordance with, for example and without limitation, RFC 6824. As shown in FIG. 1, a MPTCP connection between device 104 and MPTCP proxy 118 includes uplink traffic 130 from device 104, and multiple downlink paths or subflows, 132, 134, and 136.

Network device 102 employs a blocking technique or mechanism 140 to restrict traffic in a first direction to a single path or subflow. For illustrative purposes, restriction is described below as restricting uplink traffic to a single path or subflow in an uplink direction (i.e., uplink traffic 130). In another embodiment, downlink traffic is restricted to a single path or subflow. In FIG. 1, application 116 sends a request 138 to add an uplink subflow, which is dropped (i.e., ignored, blocked, discarded, or otherwise ignored), by network device 102, as will be described in more detail below.

Network device 102 employs a monitor function 142 to monitor traffic of the single path (i.e., uplink traffic 130). Monitor function 142 may be configured to monitor metadata of unencrypted initial packets sent in an uplink direction as part of an initial secure tunnel setup. Such metadata may include information regarding, without limitation, cryptographic algorithms, Diffie-Helman groups, and/or certificate related data.

Alternatively, or additionally, monitor function 142 may be configured to monitor subsequent (e.g., encrypted) uplink packets, such as for packet information (e.g., packet size, time, and/or packet length), and/or TCP header information (acknowledgment information).

Monitor function 142 may be configured to monitor uplink traffic and TCP acknowledgement header information (such as described further below with reference to FIG. 3), which may be used to (build) recreate traffic flow in both directions with reasonable accuracy, and map it to an appropriate traffic pattern or application behavior to provide traffic visibility of the MPTCP steam.

Network device 102 further includes a traffic estimator function 146 to estimate encrypted multi-path network traffic of downlink subflows 132, 134, and 136 from information 144 gleaned from uplink traffic 130 by monitor 142. Traffic estimator function 146 may be configured to provide estimated encrypted multi-path network traffic 148 to an encrypted traffic analytics (ETA) system 150.

A TCP header for uplink packets provides acknowledgement packet information, which is actually information about packets in downlink path (subflows). Acknowledgement information regarding downlink packets in terms of the sequence number, acknowledgment packets, and/or acknowledgment packet length may be useful to recreate or estimate downlink packet flow and pattern with reasonable accuracy.

The network device 102 can construct, estimate, and/or model a reasonably accurate network traffic pattern for a multi-path TCP application in both uplink and downlink directions.

As an example, and without limitation, assume that the following sequence of acknowledgment numbers is obtained, from an uplink path: {2737, 5473, 8209, 10945, 11186}. It follows that a server (e.g., server 106 in FIG. 1), sent the following bursts of application data: {2736, 2736, 2736, 2736, 241}. Based on reasonable assumptions and/or comparisons to historical data, a determination may be made regarding the maximum amount of application data given different TCP/IP header configurations. This information may be broken down as {1368, 1368, 1368, 1368, 1368, 1368, 1368, 1368, 241}, and timing between packets may be inferred with historical data and timestamps of the acknowledgements, such as by normalizing inter-packet timing based on a delay between observable packet bursts and round trip delay time (RTT) estimates.

Alternatively, or additionally, data may be merged into application data records by assuming synchronous or pipelined communication. For synchronous communication, burst lengths may be concatenated until the sequence number changes. For pipelined communication, a sequence of application data bursts may be analyzed or monitored for a number of change-points equal to an inferred number of pipelined requests. This data can be simulated with datasets, assuming there is only access to one direction of the traffic, to derive the bidirectional data. This process helps to ameliorate the artifacts of the data generation process with respect to a machine learning algorithm's performance.

Network device 102 may be configured as described in one or more examples below. Network device 102 is not, however, limited to any of the following examples.

Figure 2:
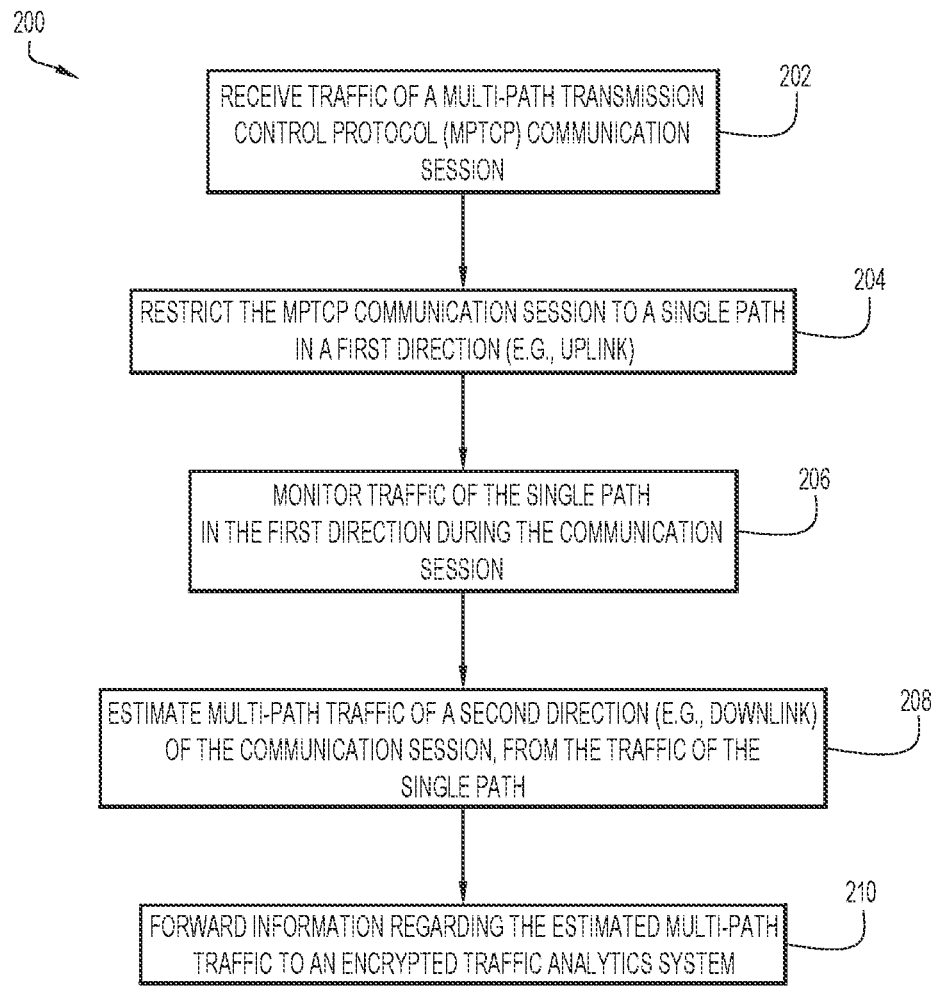
FIG. 2 is a flowchart of a method of estimating encrypted MPTCP traffic according to an example embodiment.

Reference is now made to FIG. 2. FIG. 2 illustrates a high-level flowchart of a method 200 of estimating encrypted MPTCP traffic. Method 200 may be performed by a network device, such as network device 102 in FIG. 1. Method 200 is not, however, limited to the example of FIG. 1. Reference is also made to FIG. 1 for purposes of the description of FIG. 2.

At 202, a network device receives traffic of a MPTCP connection, such as described above with respect to network device 102 in FIG. 1.

At 204, the network device 102 restricts the MPTCP connection to a single path in a first direction, such as described above by blocking function 140 with respect to the request to add uplink subflow 138 as shown in FIG. 1.

At 206, the network device 102 monitors traffic of the single path in the first direction, such as described above by the monitor function 142 of the uplink traffic 130 shown in FIG. 1.

At 208, the network device estimates multi-path traffic of a second direction based on the monitored traffic of the single uplink path, such as described above with respect to traffic estimator function 146 in FIG. 1.

At 210, the network device 102 forwards information regarding the estimated multi-path traffic is provided to an encrypted traffic analytics (ETA) system, e.g., estimated encrypted multi-path traffic 148 to ETA system 150 as shown in FIG. 1.

Figure 3:
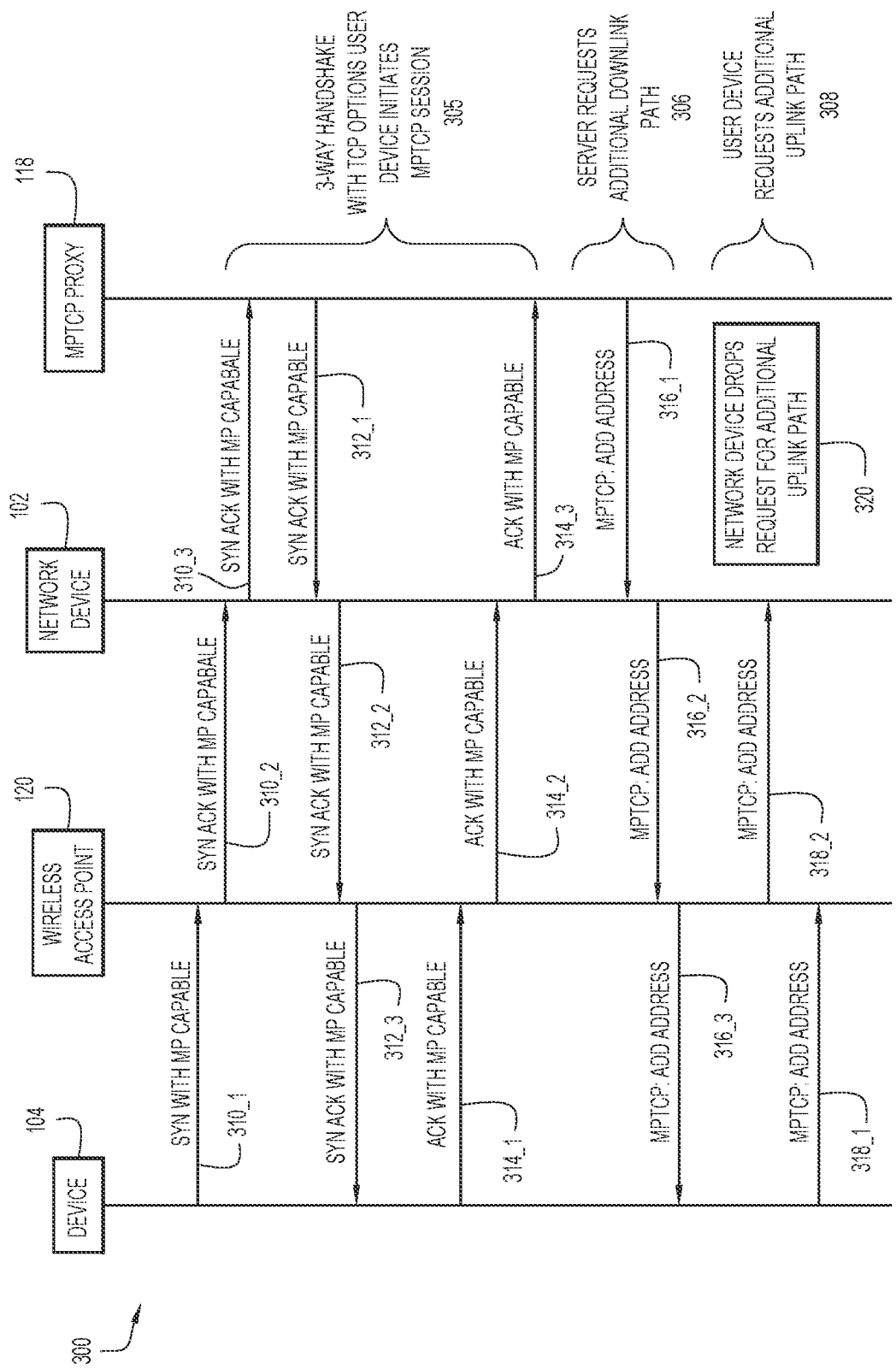
FIG. 3 is a sequence diagram illustrating communications between a multi-path capable user device and a MPTCP proxy, according to an example embodiment.

Reference is now made FIG. 3. FIG. 3 shows a sequence diagram 300 for communications similar to those depicted in FIG. 1, involving multi-path capable user device 104 (e.g., a smart telephone), MPTCP proxy 118, network device 102, and wireless access point 120. Reference is also made to FIG. 1 for purposes of the description of FIG. 3.

In FIG. 3, network device 102 interfaces between user device 104 and MPTCP proxy 118 as user device 104 initiates a three-way handshake 305 with MPTCP proxy 118 to establish a multi-path connection. The three-way handshake is initiated when, at 305, the user device 104 sends a synchronization (SYN) with multi-path (MP) capable message to the wireless access point 120.

In the first part of three-way handshake 305, device 104 sends a message 310_1, which includes a MP_Capable option in a SYN segment to indicate that device 104 supports MPTCP. The MP_Capable option may include, or may be accompanied by a random key to be used for security purposes. The wireless access point 120 forwards the message 310_1 to network device 102 as a message 312_2. Network device 102 forwards the message to MPTCP proxy 118 as a message 310_3.

In the second part of three-way handshake 305, MPTCP proxy 118 replies with a message 312_1. Message 312_1 includes a synchronize and acknowledgement (SYN+ACK) segment that contains the MP_Capable option. Message 312_1 may include a random key to be used for security purposes. Network device 102 forwards the message to wireless access point 120 as a message 312_2. Wireless access point 120 forwards the message to device 104 as a message 312_3.

In the third part of three-way handshake 305, device 104 sends a message 314_1 that includes an acknowledgement with the MP_Capable option to confirm utilization of MPTCP. The wireless access point 120 forwards this to network device 102 as a message 314_2. Network device 102 forwards the message to MPTCP proxy 118 as a message 314_3.

Three-way handshake 305 establishes a first TCP subflow over one interface, such as uplink traffic 130 and downlink subflow 132 as shown in FIG. 1.

Next, MPTCP proxy 118 requests an additional downlink path or subflow at 306. The request is illustrated as a message MPTCP:ADD Address 316_1. Network device 102 forwards the message to wireless access point 120 as a message 316_2. Wireless access point 120 forwards the message to device 104 as a message 316_3 to establish a second downlink subflow (e.g., downlink subflow 132 shown in FIG. 1). Additional downlink subflows (e.g., downlink subflow 134 and/or downlink subflow 136 shown in FIG. 1), may be initiated in a similar fashion.

Device 104 requests an additional uplink path or subflow at 308. The request is illustrated as a message, MPTCP: ADD Address 318_1. Message 318_1 is received by wireless access point 120, which forwards it to network device 102 as a message 318_2. In order to restrict traffic in the uplink direction to a single path, network device 102 drops message 318-2, as shown at 320.

Restricting uplink traffic to a single path, as opposed to downlink traffic, may be useful where the majority of traffic of an application is in the downlink direction (e.g., streaming content). Restricting downlink traffic to a single path, as opposed to uplink traffic, may be useful where the majority of traffic of an application is in the uplink direction (e.g., uploading content) from a user device to a server application.

Restricting uplink traffic to a single uplink path, and monitoring the single uplink path may also be useful to monitor initial unencrypted packets for traffic analysis (ETA).

In one embodiment, the network device 102 is configurable to restrict traffic to a single path in a predetermined direction.

In another embodiment, the network device 102 is configurable to restrict traffic to a single path in a selectable direction. An application may, for example, use a vendor-specific field in a TCP option to specify if the application is uplink intensive or downlink intensive. In this example, a network device may restrict traffic to a single path in an appropriate direction.

The network device 102 need not entirely disable TCP option 30. Rather, the network device 102, as disclosed herein, may be configured to provide a granular filtering of TCP options, such as to, for example, block MPTCP TCP subtype: Add Address option within TCP option 30. This will restrict an application from initiating multiple MPTCP subflows in a given direction (i.e., uplink or downlink).

Figure 4:
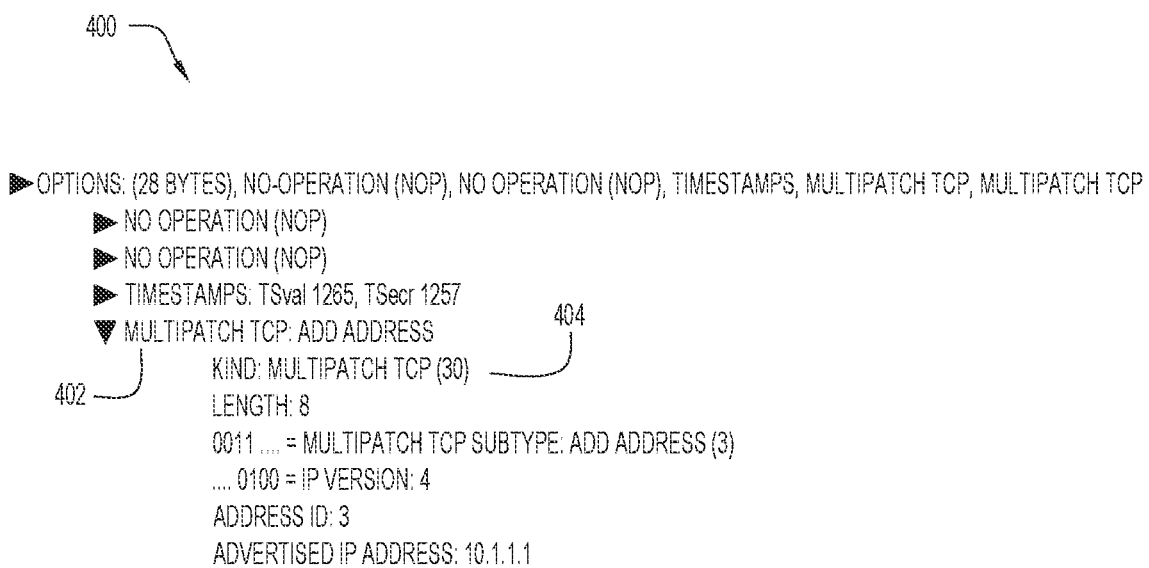
FIG. 4 illustrates an example configuration of a network device to allow multiple TCP paths (i.e., subflows) in a first direction (e.g., downlink), and to limit traffic in a second direction (e.g., uplink) to a single path, according to an example embodiment.

Reference is now made to FIG. 4. FIG. 4 illustrates an example configuration 400 to add a subflow to a MPTCP connection using a Multipath TCP: Add Address command 104, and a Kind: Multipath TCP (30) parameter 404.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), field programmable gate array (FPGA), a system-on-a-chip (SOC), and combinations thereof.

Figure 5:
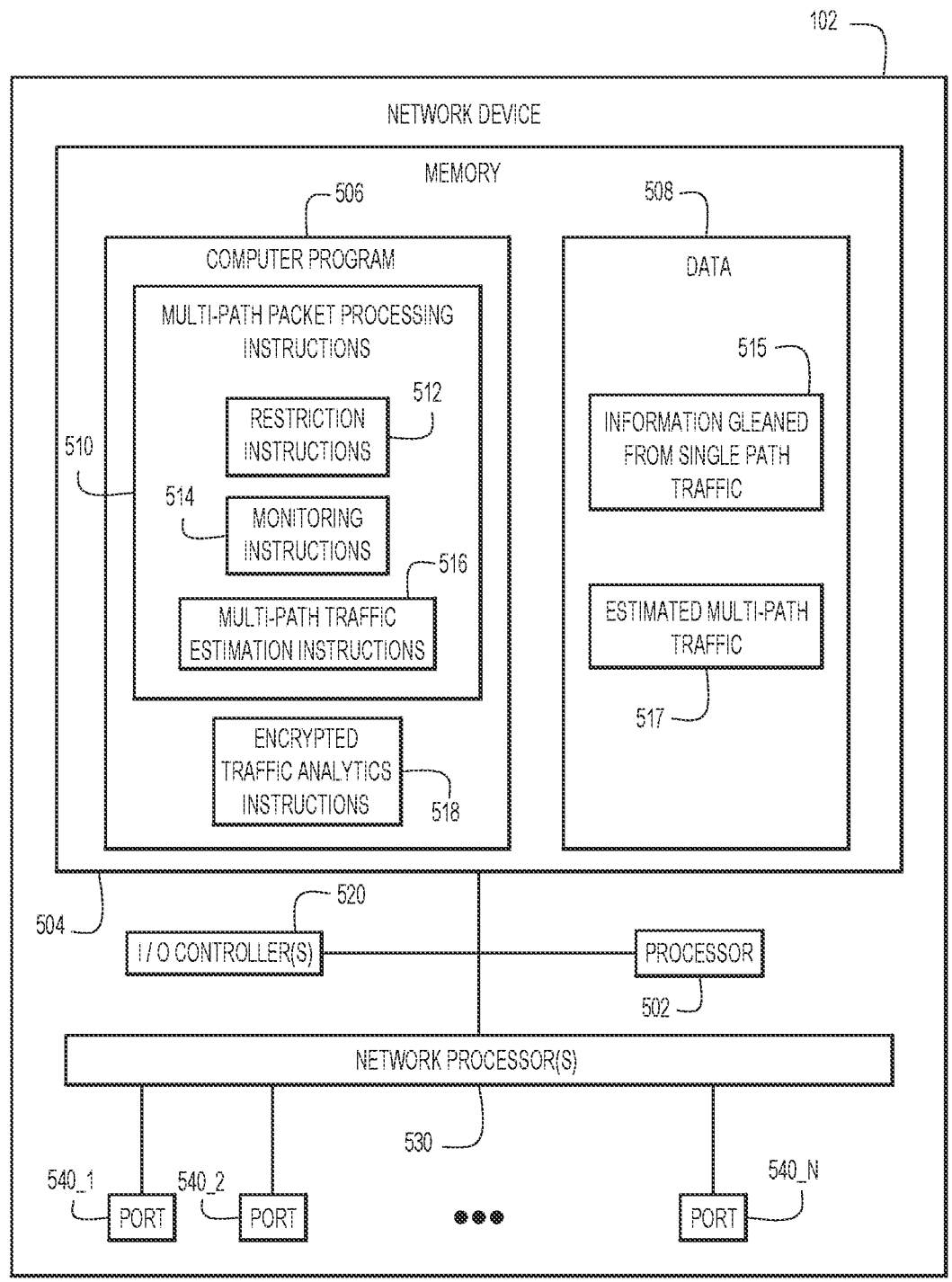
FIG. 5 is a block diagram of a network device configured to estimate encrypted multi-path network traffic, according to an example embodiment.

Turning to FIG. 5, a block diagram is shown of a network device 102 configured to estimate encrypted multi-path network traffic, which may be useful in analyzing encrypted network traffic, according to the techniques described above in connection with FIGS. 1-4.

Network device 102 includes one or more processors, illustrated here as a processor 502, to execute instructions of a computer program 506 encoded within a memory 504. The memory 504 may include a transitory or non-transitory computer-readable medium.

Memory 504 further includes data 508, which may be used by processor 502 during execution of computer program 506, and/or generated by processor 502 during execution of computer program 506. The memory 504 be read only memory (ROM), random access memory (RAM), magnetic disk storage media devices, optical storage media devices, flash memory devices, electrical, optical, or other physical/tangible memory storage devices. Thus, in general, the memory 504 may comprise one or more tangible (non-transitory) computer readable storage media (e.g., a memory device) encoded with software comprising computer executable instructions and when the software is executed (by the processor 502) it is operable to perform the operations described herein.

Processor 502 may include one or more instruction processors and/or processor cores, and a control unit to interface between the instruction processor(s)/core(s) and computer readable medium 504. Processor 502 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

In the example of FIG. 5, computer program 506 includes multi-path TCP (MPTCP) instructions 510 to cause processor 502 to handle traffic in accordance with a multi-path transmission control protocol.

MPTCP instructions 510 include restriction instructions 512 to cause processor 502 restrict a MPTCP connection to a single path in a first direction (i.e., uplink or downlink), such as described in one or more examples herein.

MPTCP instructions 510 further include monitoring instructions 514 to cause processor 502 to monitor traffic of the single path to provide information 515, such as described in one or more examples herein.

MPTCP instructions 510 further include multi-path traffic estimation instructions 516 to cause processor 502 to estimate traffic 517 of the multi-path connection from information obtained from monitoring the single path, such as described in one or more examples herein.

Computer program 506 may further include encrypted traffic analytics instructions 518 to cause processor 502 to analyze estimated traffic 517, such as described in one or more examples herein.

The network device 102 further includes one or more input/output controllers 520, one or more networking processor(s) 530 and a plurality of ports/interfaces 540_1-540_N connected to the network processor(s) 530. The networking processor(s) 530 may consist of one or more linecards that includes one or more ASICs configured and hardware memory resources. The network processor(s) 530 are configured to perform networking functions, such as routing and/or switching of network traffic received at the ports 540_1-540_N.

Encrypted traffic in a multi-path TCP stream creates a challenge for networking traffic monitoring and security. This techniques presented herein block the multi-path TCP traffic (allowing a single path) in one direction (such as uplink) and allows traffic in the other direction (such as downlink) to use multipath. This solution uses uplink traffic and the TCP acknowledgment header information to recreate traffic flow in both directions with reasonable accuracy, in order to map it to an appropriate traffic pattern or application behavior to obtain traffic visibility in the multi-path TCP stream.

In summary, encrypted traffic over a multi-path TCP stream brings up a challenge for networking traffic monitoring and security. A solution is presented herein that blocks the MPTCP traffic (allowing a single path) in one direction (for example, uplink) and allows the other direction (for example, downlink) to use multi-path. This solution uses uplink traffic and TCP acknowledgment header information to recreate traffic flow in both directions with reasonable accuracy to map it to appropriate traffic pattern or application behavior in order to obtain traffic visibility in the MPTCP steam. This solution enables or enhances an ETA solution for MPTCP-based traffic, and in so doing, will assist in adoption/deployment of MPTCP by providing visibility of traffic.

Again, in the foregoing description, the uplink direction has been considered for restricting to the single path because of the assumption that most of the applications have less traffic on the uplink compared to downlink traffic, where multipath adds value. However, these techniques can use a single path traffic capture on either direction (uplink or downlink) to recreate the visibility of the traffic. If an application opportunistically adds a second uplink path when a Wi-Fi connection, for example, becomes available in addition to the macro-cellular link, then enterprise systems which do not have visibility to macro-cellular traffic can drop the uplink request (observing the TCP multi-path option 30) to add the address in the uplink path.

In summary, in one form, a method is provided comprising: at a network device in a network: receiving traffic of a multi-path transmission control protocol (MPTCP) communication session; restricting the MPTCP communication session to a single path in a first direction; monitoring traffic of the single path during the MPTCP communication session; and estimating multi-path traffic of a second direction of the MPTCP communication session from the traffic of the single path.

In another form, an apparatus comprising: a network interface device configured to receive traffic of a multi-path transmission control protocol (MPTCP) communication session; and a processor configured to: restrict the MPTCP communication session to a single path in a first direction; monitor traffic of the single path during the communication session; and estimate multi-path traffic of a second direction of the communication session from the traffic of the single path.

In still another form, a non-transitory computer readable media is provided that is encoded with a computer program that includes instructions to cause a processor to: receive traffic of a multi-path transmission control protocol (MPTCP) communication session; restrict the MPTCP communication session to a single path in a first direction; monitor traffic of the single path during the MPTCP communication session; and estimate multi-path traffic of a second direction of the MPTCP communication session from the traffic of the single path.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method comprising:
    at a network device in a network:
        receiving traffic of a multi-path transmission control protocol (MPTCP) communication session;
        restricting the MPTCP communication session to a single path in a first direction;
        monitoring traffic of the single path during the MPTCP communication session for information indicative of multi-path traffic of a second direction of the MPTCP communication session, wherein the traffic of the single path follows a path that includes the network device and the multi-path traffic of the second direction follows a path that does not include the network device;
        based on the information indicative of the multi-path traffic of the second direction, generating an estimation of the multi-path traffic of the second direction from an unencrypted initial packet sent over the single path and from a sequence of acknowledgment numbers of the single path, including computing one or more differences between acknowledgment numbers in adjacent positions in the sequence of acknowledgment numbers; and
        in response to generating the estimation of the multi-path traffic of the second direction of the MPTCP communication session, providing, to a threat detection system, an indication of the estimation of the multi-path traffic of the second direction of the MPTCP communication session.

2. The method of claim 1, further comprising:
    generating the estimation of the multi-path traffic of the second direction from the unencrypted initial packet sent over the single path as part of a secure tunnel setup procedure.

3. The method of claim 2, wherein generating the estimation of the multi-path traffic of the second direction from the unencrypted initial packet sent over the single path as part of the secure tunnel setup procedure further includes:
    generating the estimation of the multi-path traffic of the second direction from TCP header information of the unencrypted initial packet.

4. The method of claim 1, wherein:
    the monitoring includes monitoring TCP header information of the traffic of the single path regarding one or more of a sequence number, an acknowledgment packet, and an acknowledgment packet length, the method further comprising:
    generating an estimation of multi-path packet flow and patterns from the TCP header information.

5. The method of claim 1, wherein:
    the monitoring includes monitoring metadata of the traffic of the single path for information regarding one or more of cryptographic algorithms, Diffie-Helman groups, and certificate related data, the method further comprising:
        generating the estimation of the multi-path traffic of the second direction from the metadata.

6. The method of claim 1, wherein generating the estimation of the multi-path traffic of the second direction from the sequence of acknowledgment numbers of the single path further includes:
    based on the one or more differences, identifying one or more discrete bursts of application data.

7. The method of claim 1, wherein providing the indication to the threat detection system includes:
    providing the indication to a system configured to analyze encrypted traffic.

8. An apparatus comprising:
    a network interface device configured to receive traffic of a multi-path transmission control protocol (MPTCP) communication session; and
    a processor configured to:
        restrict the MPTCP communication session to a single path in a first direction;
        monitor traffic of the single path during the MPTCP communication session for information indicative of multi-path traffic of a second direction of the MPTCP communication session, wherein the traffic of the single path follows a path that includes the apparatus and the multi-path traffic of the second direction follows a path that does not include the apparatus;
        based on the information indicative of the multi-path traffic of the second direction, generate an estimation of the multi-path traffic of the second direction from an unencrypted initial packet sent over the single path and from a sequence of acknowledgment numbers of the single path, including computing one or more differences between acknowledgment numbers in adjacent positions in the sequence of acknowledgment numbers; and
        in response to generating the estimation of the multi-path traffic of the second direction of the MPTCP communication session, provide, to a threat detection system, an indication of the estimation of the multi-path traffic of the second direction of the MPTCP communication session.

9. The apparatus of claim 8, wherein the processor is further configured to:
    generate the estimation of the multi-path traffic of the second direction from the unencrypted initial packet sent over the single path as part of a secure tunnel setup procedure.

10. The apparatus of claim 9, wherein the processor is further configured to:
    generate the estimation of the multi-path traffic of the second direction from TCP header information of the unencrypted initial packet.

11. The apparatus of claim 8, wherein the processor is further configured to:
    monitor TCP header information of the traffic of the single path regarding one or more of a sequence number, an acknowledgment packet, and an acknowledgment packet length; and
    generate an estimation of multi-path packet flow and patterns from the TCP header information.

12. The apparatus of claim 8, wherein the processor is further configured to:
    monitor metadata of the traffic of the single path for information regarding one or more of cryptographic algorithms, Diffie-Helman groups, and certificate related data; and generate the estimation of the multi-path traffic of the second direction from the metadata.

13. The apparatus of claim 8, wherein the processor is further configured to:
    based on the one or more differences, identify one or more discrete bursts of application data.

14. The apparatus of claim 8, wherein the processor is configured to:
    provide the indication to a system configured to analyze encrypted traffic.

15. A non-transitory computer readable media encoded with a computer program that includes instructions to cause a processor of a network device to:
    receive traffic of a multi-path transmission control protocol (MPTCP) communication session;
    restrict the MPTCP communication session to a single path in a first direction;
    monitor traffic of the single path during the MPTCP communication session for information indicative of multi-path traffic of a second direction of the MPTCP communication session, wherein the traffic of the single path follows a path that includes the network device and the multi-path traffic of the second direction follows a path that does not include the network device;
    based on the information indicative of the multi-path traffic of the second direction, generate an estimation of the multi-path traffic of the second direction from an unencrypted initial packet sent over the single path and from a sequence of acknowledgment numbers of the single path, including computing one or more differences between acknowledgment numbers in adjacent positions in the sequence of acknowledgment numbers; and
    in response to generating the estimation of the multi-path traffic of the second direction of the MPTCP communication session, provide, to a threat detection system, an indication of the estimation of the multi-path traffic of the second direction of the MPTCP communication session.

16. The non-transitory computer readable media of claim 15, further including instructions to cause the processor to:
    generate the estimation of the multi-path traffic of the second direction from TCP header information of the unencrypted initial packet sent over the single path as part of a secure tunnel setup procedure.

17. The non-transitory computer readable media of claim 15, further including instructions to cause the processor to:
    monitor TCP header information of the traffic of the single path regarding one or more of a sequence number, an acknowledgment packet, and an acknowledgment packet length; and
    generate an estimation of multi-path packet flow and patterns from the TCP header information.

18. The non-transitory computer readable media of claim 15, further including instructions to cause the processor to:
    monitor metadata of the traffic of the single path for information regarding one or more of cryptographic algorithms, Diffie-Helman groups, and certificate related data; and
    generate the estimation of the multi-path traffic of the second direction from the metadata.

19. The non-transitory computer readable media of claim 15, further including instructions to cause the processor to:
    based on the one or more differences, identify one or more discrete bursts of application data.

20. The non-transitory computer readable media of claim 15, including instructions to cause the processor to:
    provide the indication to a system configured to analyze encrypted traffic.

* * * * *